US008615808B2

(12) United States Patent
Watanabe (10) Patent No.: US 8,615,808 B2
(45) Date of Patent: Dec. 24, 2013

(54) METHOD OF PROCESSING DATA TO ENABLE EXTERNAL STORAGE THEREOF WITH MINIMIZED RISK OF INFORMATION LEAKAGE

(75) Inventor: Yuji Watanabe, Yamato (JP)

(73) Assignee: International Business Machines Corporation, Armonk, NY (US)

(*) Notice: Subject to any disclaimer, the term of this patent is extended or adjusted under 35 U.S.C. 154(b) by 148 days.

(21) Appl. No.: 13/173,491

(22) Filed: Jun. 30, 2011

(65) Prior Publication Data
US 2012/0005486 A1   Jan. 5, 2012

(30) Foreign Application Priority Data

Jun. 30, 2010   (JP) .................................. 2010-149939

(51) Int. Cl.
*H04L 29/06*   (2006.01)
(52) U.S. Cl.
USPC ........................................... 726/27; 713/194
(58) Field of Classification Search
USPC ......... 726/26, 27; 713/189, 193, 194; 705/50, 705/51, 2, 3
See application file for complete search history.

(56) References Cited

U.S. PATENT DOCUMENTS

2010/0161926 A1* 6/2010 Li et al. ........................ 711/163

FOREIGN PATENT DOCUMENTS

JP   2006301849 A   11/2006

OTHER PUBLICATIONS

Shamon: A System for Distributed Mandatory Access Control; McCune, Jaeger, Berger, Caceres, Sailer; 2006.

* cited by examiner

*Primary Examiner* — Edward Zee
(74) *Attorney, Agent, or Firm* — Jordan IP Law, LLC (57) ABSTRACT

A method is provided to process data so that the data can be externally stored with minimized risk of information leakage. A framework (virtual execution framework) based on virtual machines (VMs) is utilized as a substitute for a trusted institution. Encryption of consolidated data can reduce risk of information leakage and enhance security. Since the virtual execution framework can control connection and direction of communication, financial institutions are allowed to apply encryption to data on their own, which makes the data further appropriate for external storage. By allowing financial institutions to apply their own decryption, it is possible to prevent one of two financial institutions from retrieving externally stored data into the external execution framework without intervention of the other. Additionally, associated acting subjects can be provided with freedom depending on the degree of information leakage risk.

9 Claims, 8 Drawing Sheets

RELATIONSHIPS BETWEEN DATA OR MODULES UPLOADED/DOWNLOADED TO/FROM MEMORY SPACE 100 (ROWS) AND ASSOCIATED ACTING SUBJECTS (COLUMNS)

|  | VIRTUAL EXECUTION FRAMEWORK 10 | COMPUTER A 20 | COMPUTER B 30 | THIRD PARTY (E.G., AUDITING FIRM)'S COMPUTER 500 |
|---|---|---|---|---|
| DATA A (ORIGINAL DATA) ENCRYPTION MODULE A DECRYPTION MODULE A |  | FOR ITS OWN DATA, PREFERABLY PERFORMS UPLOAD/DOWNLOAD BY ITSELF |  |  |
| DATA B (ORIGINAL DATA) ENCRYPTION MODULE B DECRYPTION MODULE B |  |  | FOR ITS OWN DATA, PREFERABLY PERFORMS UPLOAD/DOWNLOAD BY ITSELF |  |
| CALCULATION MODULE | ENFORCES DIRECTION OF COMMUNICATION FOR DATA PROCESSING ON A AND B | MAY COOPERATE WITH B UNDER MUTUAL AGREEMENT, OR COMMISSION THIRD PARTY | MAY COOPERATE WITH A UNDER MUTUAL AGREEMENT, OR COMMISSION THIRD PARTY | MAY BE COMMISSIONED BY A AND B AS THIRD PARTY IN NEUTRAL POSITION AS ARBITER OR MEDIATOR |
| DATA AB (CONSOLIDATED DATA) |  | MAY CONFIGURE IT ACCESSIBLE ONLY TO B | MAY CONFIGURE IT ACCESSIBLE ONLY TO A | MAY BE GRANTED ACCESS FOR AUDITING |
| DUAL-ENCRYPTED DATA | ENFORCES ORDER OF ENCRYPTION AND DECRYPTION: A→B AND B→A | REQUIRED TO OBEY ENFORCEMENT BUT MAY COOPERATE WITH B ABOUT ACCESS TO EXTERNAL STORAGE 400 | REQUIRED TO OBEY ENFORCEMENT BUT MAY COOPERATE WITH A ABOUT ACCESS TO EXTERNAL STORAGE 400 |  |

FIGURE 8

METHOD OF PROCESSING DATA TO ENABLE EXTERNAL STORAGE THEREOF WITH MINIMIZED RISK OF INFORMATION LEAKAGE

FIELD OF THE INVENTION

The present invention relates to a data management method, and more particularly, to a method for processing data so that the data can be externally stored with minimized risk of information leakage.

BACKGROUND OF THE INVENTION

There exists a need to aggregate data and information possessed by financial institutions across multiple institutions for analytical calculation. For example, financial statements of different financial institutions can be aggregated for auditing, comparison, or calculation of overall statistics. These analyses are expected to be further promoted also for maintaining public order, such as revealing management conditions of financial institutions and preventing a financial risk.

Financial institutions would be willing to disclose their data to a limited extent if analytical calculation is carried out by a trusted institution. The Financial Service Agency of Japan or the Federal Reserve Bank of the United States would represent such a trusted institution, but an official organization requires enormous costs for connection, operation, and maintenance. In addition, even a trusted institution cannot completely eliminate the risk of information leakage in the first place.

To have a financial institution consent to disclose proprietary data when it has some reason to keep the data confidential, sufficient attention has to be paid to security for preventing information leakage. Also, certain, financial data, such as position data and a loss calculation model, among others, are often data that financial institutions are reluctant to reveal to competitors as management know-how.

Many institutions, however, consider it acceptable to reveal their data as long as the original proprietary data is kept confidential, or the source of the original data remains hidden. Moreover, to save costs associated with data storage on their own, they often would prefer to outsource data storage, if confidentiality can be maintained.

As an example, even when statistical calculation for aggregation is just simple averaging of data possessed by two financial institutions, the parties involved sometimes only require that the data be kept consolidated, because the institutions will not dare to leak information of one another if they want to keep their own information confidential.

Published Unexamined Japanese Patent Application No. 2006-301849 discloses a technique that securely stores generated electronic information by dividing and distributing the information at multiple storage locations instead of localized storage, deletes the original electronic information residing in an internal storage, and assembles all the distributed information to reconstruct the original information.

This technique provides some benefit in terms of preventing information leak by a malicious party and securely managing data. The technique, however, is based on the premise that correct processing is performed for distributed storage of data. In addition, the amount of stored data including redundancy for reconstruction increases in proportion to the number of storages. The concept of the technique is to avoid localized management of data and seek to confine a possible source of leakage only to distributed data, but it does not provide'an entity capable of performing actions with or on the data (an action entity) with freedom about the overall process and relies on a centralized mechanism.

Shamon: A System for Distributed Mandatory. Access Control, by Jonathan M. McCune, Trent Jaeger, Stefan Berger, Ramon Caceres, and Reiner Sailer describes that virtual machines or VMs can be employed to enforce communication flow and that Mandatory Access Control (MAC) is a practicable general technique.

SUMMARY OF THE INVENTION

The present invention provides a method to process, data on a calculation framework of a third-party institution so that the data can be externally stored with minimized risk of information leakage.

A framework (a virtual execution framework) based on virtual machines (VMs) is utilized as a substitute for a trusted institution. Encryption of consolidated data can reduce risk of information leakage and enhance security. Since the virtual execution framework can control connection and direction of communication, financial institutions are allowed to apply encryption to data on their own, which makes the data further appropriate for external storage. By allowing financial institutions to apply their own decryption, it is possible to prevent one of two financial institutions from retrieving externally stored data into the virtual execution framework without intervention of the other. Additionally, associated action entities can be provided with freedom depending on the degree of information leakage risk.

Such consolidation and encryption of data ensures high reliability of data protection on a calculation framework of a third-party institution, thus eliminating the necessity for an institution to keep volatile data in a memory space in a VM, which is typically expensive and small in capacity, on its own. Meanwhile, permanent data can be stored in external public cloud, which generally provides inexpensive bulk storages.

DETAILED DESCRIPTION

Figure 1:
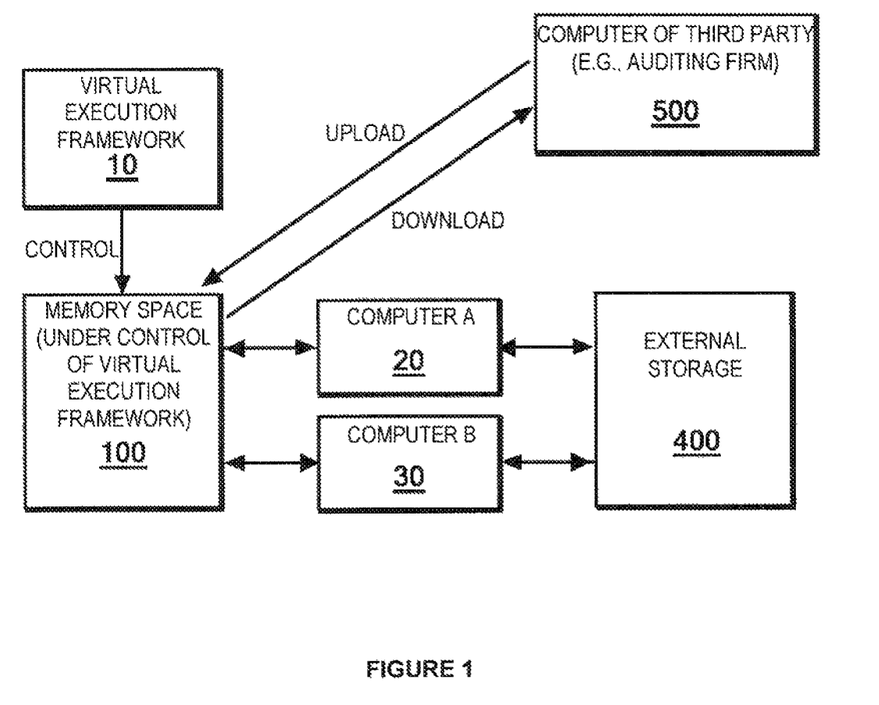
FIG. 1 illustrates an overall configuration of a system in which a method according to an embodiment of the invention is implemented.

FIG. 1 shows an overall configuration of a system in which a method according to an embodiment of the invention is implemented. The method according to an embodiment of the invention is implemented by utilizing a framework (a virtual execution framework 10) that is based on virtual machines or VMs. Virtual machines are known in the art, and are described in detail, for example, in Shamon: A System for Distributed Mandatory Access Control, by Jonathan M. McCune, Trent Jaeger, Stefan. Berger Ramon Caceres, and Reiner Sailer, an will not be described further herein.

The virtual execution framework 10 is a kind of computer and serves as a calculation framework of a third-party institution having a memory space 100 under control of the framework 10. Multiple computers including a computer A 20 and a computer B 30 independently upload data and/or modules to the memory space 100 or download data and/or modules (programs or program codes for execution by computers) from the memory space 100. The computers also upload data from the memory space 100 to an external storage 400 or download data from the external storage 400 to the memory space 100 independently or in cooperation with each another.

For example, the computer A 20 can represent a computer managed by one financial institution and the computer B 30 can represent a computer managed by another financial institution. The memory space 100 and the virtual execution framework 10 that controls the space 100 represent a computer that can serve as a substitute for a trusted institution.

A computer 500 of a third party (e.g., an auditing firm) can also represent a computer that is able to upload or download data and/or modules to and from the memory space 100. Although access to the memory space 100 allowed to the computer 500 of a third party (e.g., an auditing firm) is limited, the computer 500 can still substitute for a trusted institution and serve as a calculation framework of the third-party institution in that it has access to the memory space 500, though partially, for the purpose of auditing.

The term "external" of the external storage 400 is intended to merely mean transport to outside the memory space 100 and has no further technically special meaning herein: the term "external" should be construed in a broad sense. In a case the memory space 100 is located inside a firewall and data is transported outside the firewall after double encryption, which will be described below, public cloud can be utilized more efficiently while minimizing information leakage risk.

Figure 2:
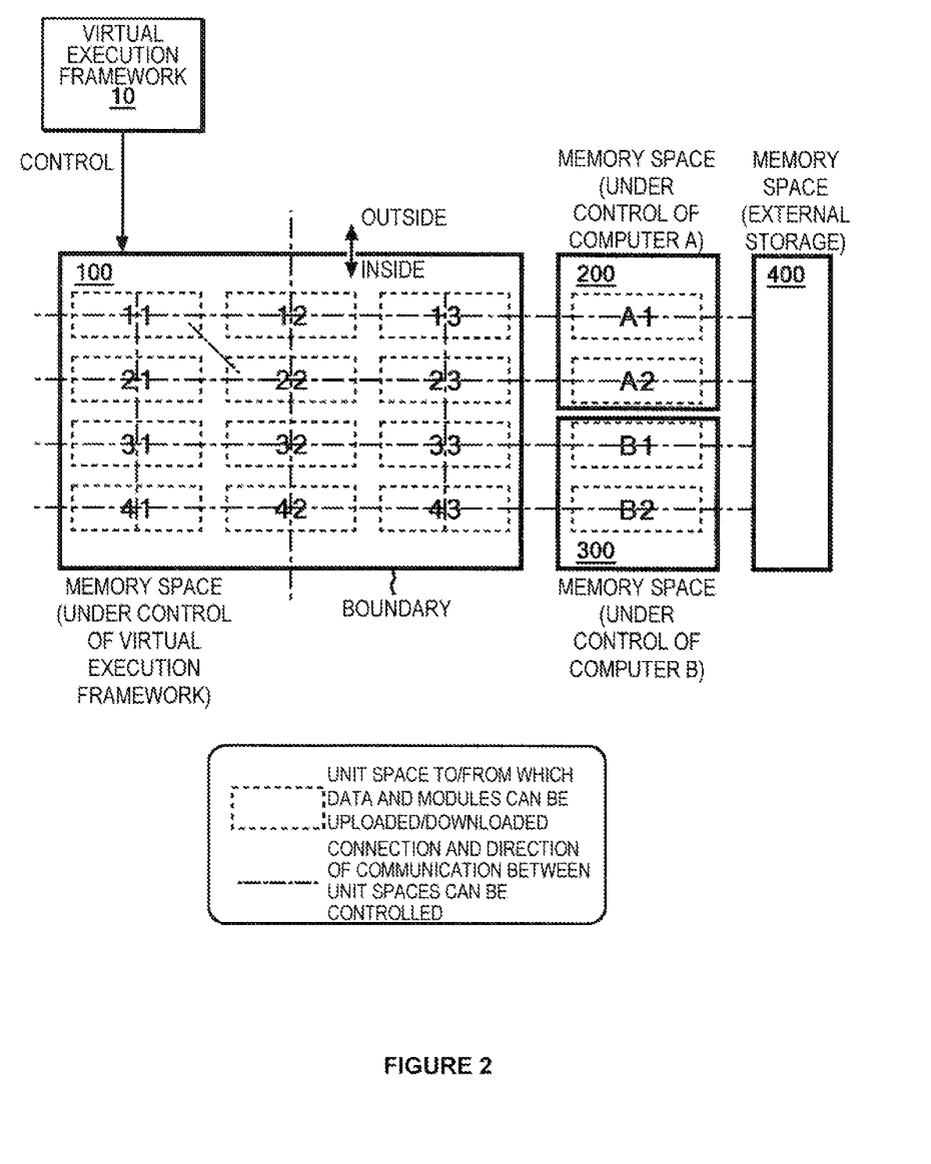
FIG. 2 schematically illustrates configurations of a memory space under control of a virtual execution framework on which a method according to an embodiment of the invention is implemented as well as memory spaces under control of multiple computers (computer A and computer B)

FIG. 2 schematically shows a configuration of a memory space 100 which is under control of the virtual execution framework on which a method according to an embodiment of the invention is implemented as well as that of memory spaces 200, 300 under control of the multiple computers (computers A and B) 20, 30. To the inside (of the boundary) of the memory space 100, data and modules can be uploaded from the computers A 20 and B 30. In the example of FIG. 2, twelve unit spaces are shown as dotted-line boxes. The twelve unit spaces are diagrammatically shown with position numbers forming a matrix, 11, 12, 13, 21, 22, 23, 31, 32, 33, 41, 42 and 43.

Chain lines are further drawn through the twelve unit spaces. The chain lines are imaginary lines implying that the connection and direction of communication can be controlled, representing possible communications between uploaded data and/or modules. As a rule of depiction in the subsequent drawings, existence of actual connection of communication is represented by a solid line instead of a chain line and direction of communication is represented by an arrow.

Herein, control of connection and direction of communication through control by the virtual execution framework 10 is called "enforcement". Put differently, enforced processing means that only limited connection and direction of communication is allowed, and thus any action that the computers A 20 and B 30 have not mutually agreed on or accepted cannot be carried out, in the expectation that the computers will agree to recognize the virtual execution framework 10 as a substitute for a trusted institution. Inside (the boundary) of the memory space 100, it is a fundamental rule that the virtual execution framework 10 enforces processing by whoever the action entity is, or an action of whoever triggers processing. The direction of communication is one of the important control factors that are enforced.

In practice, the virtual execution framework 10 is constructed on a certain-physical computer (a host computer), and realized in hardware or software, or a combination thereof. The virtual execution framework 10 controls communication of a virtual machine (VM) as follows. Communication between an entity outside the host computer and a virtual machine is realized by the virtual execution framework transferring incoming data to the host computer from the outside entity to the virtual machine, or by the virtual execution framework intercepting outgoing data from a virtual machine and transmitting the data to the entity outside the host computer.

Data communication between virtual machines is realized by the virtual execution framework 10 transferring data via the memory space of the host computer. In either case, the virtual execution framework 10 can enforce whether to permit communication and the direction of communication according to certain policies.

The chain lines in FIG. 2 just schematically represent one example, and connection and direction of communication may be controllable also between unit spaces on which chain lines are not drawn. For example, although a chain line, which indicates possible communication, in an oblique direction is drawn only between unit spaces 11 and 22 in the figure, direct communication may be performed between other unit spaces and its connection and direction may be controlled.

To each of the unit spaces, data and a module can be uploaded, and at the time of upload or at a later time when a need for access limitation arises, acting subjects that are granted access to each unit space can be configured. Acting subjects that are granted access to unit spaces include the computers A 20, B 30, and the computer 500 of a third party (e.g., an auditing firm). Acting subjects that are granted access may be centrally configured by The virtual execution framework 10, cooperatively by the computers A 20 and B 30 under a mutual agreement, or by a third party (e.g., an auditing firm) on consignment.

A chain line is also drawn from inside (the boundary of) the memory space 100 to the outside thereof. In connection with FIG. 1, data and/or modules are uploaded (or entered) from outside of the memory space 100 and downloaded (or go out) from inside of the memory space 100 on such a route crossing the boundary.

In a memory space 200 under control of computer A, two unit spaces are schematically indicated with position numbers A1 and A2. In a memory space 300 under control of computer B, two unit spaces are schematically indicated with position numbers B1 and B2. Communication can also take place between any of these unit spaces and a unit space in the memory space 100.

The connection and direction of communication between each unit space of the memory space 100 and each one in the memory spaces 200 and 300, which are under control of the computers A and B respectively, could also be enforced by the virtual execution framework 10. It is preferable in terms of reduction in information leakage risk, however, that (at least) the contents of data and modules uploaded in the memory spaces 200 and 300, which are under control of the computers A and B respectively, are kept invisible to the virtual execution framework 10.

The connection and direction of communication between the memory space 200 under control of the computer A and the memory space 400 of the external storage could be enforced by the virtual execution framework 10. Likewise, the connection and direction of communication between the memory space 300 under control of the computer B and the memory space 400 of the external storage could be enforced by the virtual execution framework 10. It will be preferable, however, not to permit the virtual execution framework 10 to control them for reduction in information leakage risk.

Basically, the virtual execution framework 10 is preferably designed to just control the memory space 100 and provide a space or place for download and upload by the computers A 20 and B 30, rather than being an action entity to perform download or upload.

Figure 3:
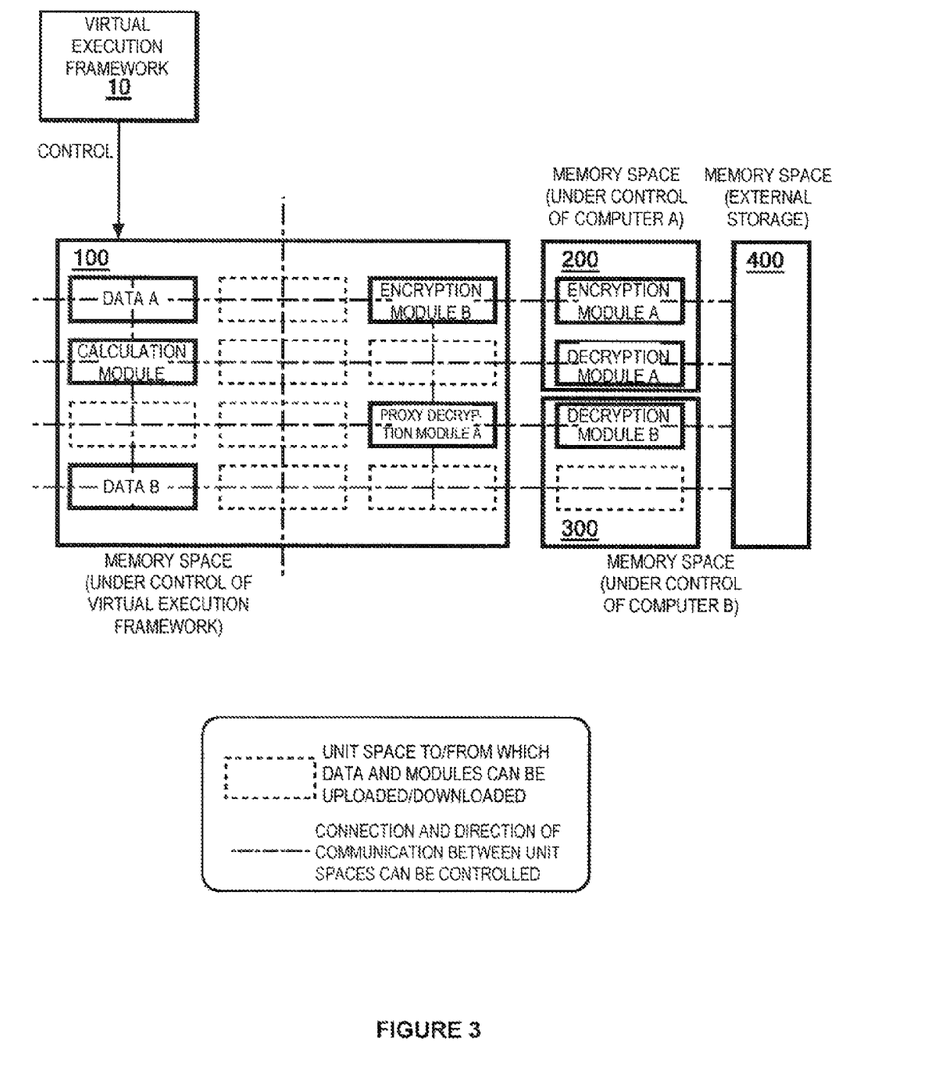
FIG. 3 schematically illustrates upload of data and modules in implementing a method according to an embodiment of the invention.

FIG. 3 schematically illustrates upload of data and modules in implementing a method according to an embodiment of the invention. Here, data A is possessed independently by the computer A 20 and is uploaded by the computer A 20 (to unit space 11). Data B is possessed independently by the computer B 30 and is uploaded by the computer B 30 (to unit space 41).

As acting subjects that are allowed to access each unit space can be configured individually at the time of upload or at a later time when necessity for access limitation arises, the data A may be configured to be inaccessible to the computer B 30 and data B be inaccessible to the computer A 20. This setting can be effective when the computers A and B want to keep their own data confidential.

Thus, various settings for minimizing the risk of information leakage can be flexibly made for parties concerned about such risk (computers A and B in this example).

A proxy decryption module A (unit space 33), an encryption module A (unit space A1), and a decryption module A (unit space A2) are modules configured specifically on the computer A, which uploads the modules (by the time that they are required for processing). The encryption module A (unit space A1) has a public key of the computer A and the decryption module A (unit space A2) has a secret key of the computer A.

An encryption module B (unit space 13) and a decryption module B (unit space B1) are modules configured specifically on the computer B, which uploads the modules (by the time that they are required for processing). Upload of the encryption module B (unit space. 13) and the proxy decryption module A (unit space 33) is performed via and under control of the virtual execution framework 10. The encryption module B (unit space 13) and the proxy decryption module A (unit space 33) keep the public key of the computer B, and the decryption module B (unit space B1) keeps the secret key of the computer B.

The decryption module A (unit space A2) should not be uploaded to the memory space 100 because the module can be decoded in the event that the virtual execution framework 10 comes under an outside attack. Similarly, the decryption module B (unit space B1) should not be uploaded to the memory space 100 either.

It is also possible to configure the encryption module B to be inaccessible to the computer A 20, which setting can be effective when it is desirable that even an encryption technique that is used be hidden from others.

As will be discussed later, output of the encryption module B is made to reach only the computer A by enforcement when exiting the memory space to the outside thereof. Input from the computer B to the inside of the memory space is directed only to the proxy decryption module A by enforcement.

A calculation module (unit space 21) may be uploaded by the computers A 20 and B 30 cooperatively under a mutual agreement, or by either one of them. The calculation module may also be uploaded by a trusted institution (e.g., the computer 500 of a third party, such as an auditing firm) as an arbiter or mediator in a neutral position, or under a commission from the computers A 20 and B 30.

Figure 4:
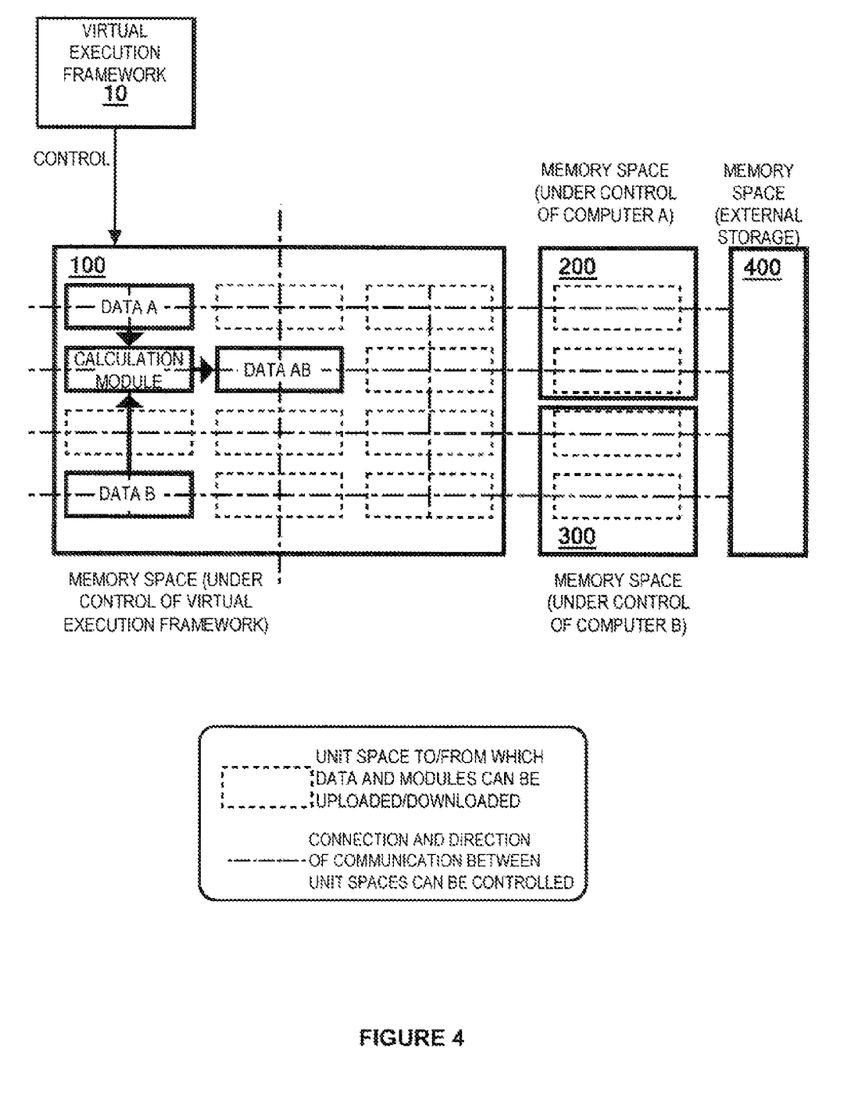
FIG. 4 schematically illustrates calculation of consolidated data AB from data A and data B in implementing a method according to an embodiment of the invention.

FIG. 4 schematically illustrates calculation of data AB which consolidates data A and data B in implementing a method according town embodiment of the invention. The calculation module takes data A and data B as input, and outputs data AB as consolidated data. Thus, data processing is enforced by the virtual execution framework 10 so that the start point of an arrow represents input and the end point represents output. This way of data processing is enforced regardless of who the action entity is or for an action regardless of who triggers processing.

In relation to calculation of data AB, if the calculation module has been uploaded by the computer 500 of a third party (an auditing firm), data AB may be made accessible only to the computer 500. This setting can be effective when auditing is the only purpose.

It is also possible that even if data AB is calculated merely by simple averaging of data A and data B, their owners find no harm in knowledge of data A by the computer B and vice versa as long as the data is kept consolidated. In such a case, data AB may be made accessible only to the computers A and B. This setting can be effective when the data owners are expected not to dare to leak one another's information.

In some cases, control is exercised so as not to allow the computer A, computer B, or a third party to access data AB. This is the case when consolidation is not sufficient and the original data can be still identified after consolidation, or for intermediate calculation data prior to generation of data that can be disclosed to a third party, for instance.

Figure 5:
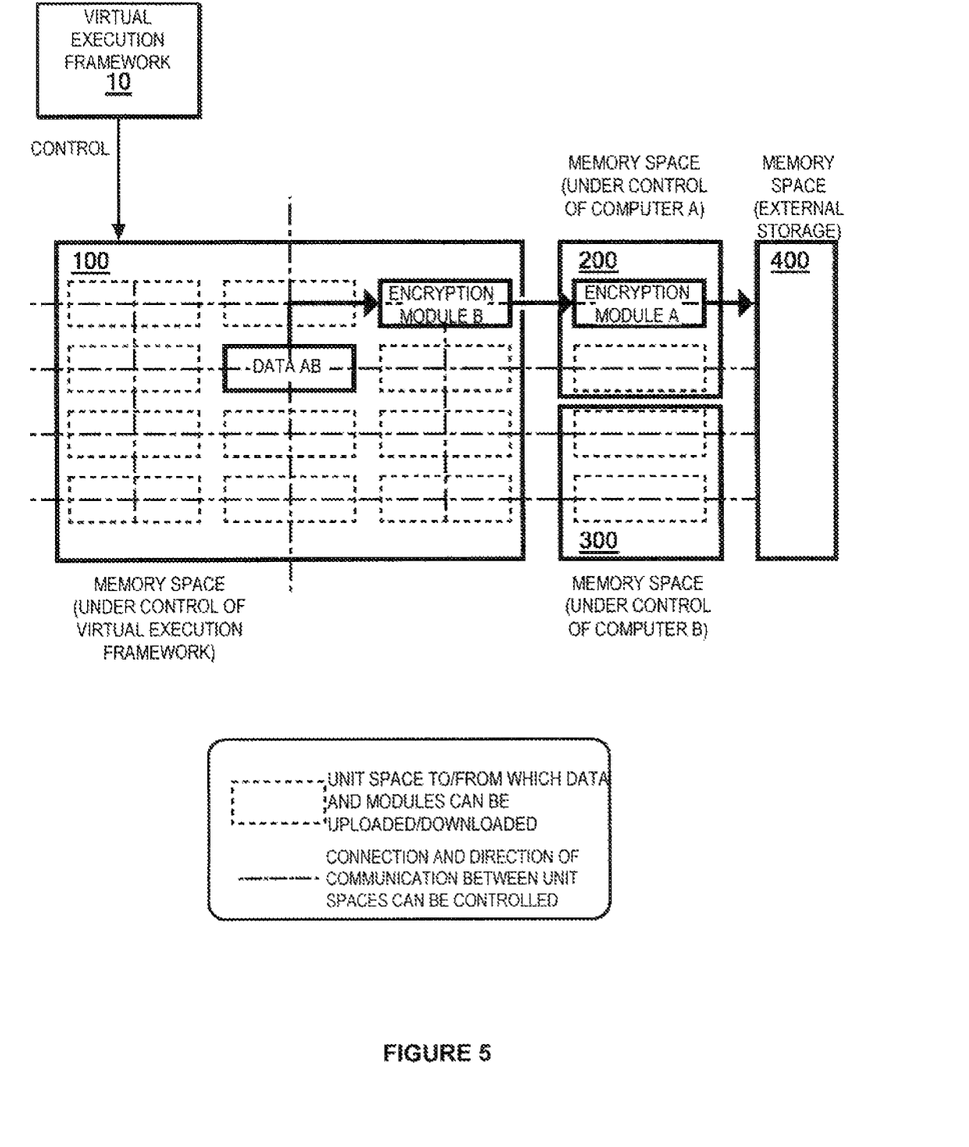
FIG. 5 schematically illustrates double encryption of consolidated data AB in implementing a method according to an embodiment of the invention.

FIG. 5 schematically illustrates double encryption of data AB, which is consolidated data, in implementing a method according to an embodiment of the invention. Data AB is first encrypted by the encryption module B and further by the encryption module A. The order of encryption is enforced by the virtual execution framework 10, but the order need not be B to A: communication from an encryption module X (X={A, B}) within the memory space 100 has only to be enforced by the virtual execution framework 10 so that it is directed only to an external encryption module Y (i.e., the one other than X).

The data thus dual-encrypted is uploaded to the external storage 400. The data may be uploaded to the external storage 400 by either one or both of the computers A and B. In this manner, the data is externally stored. Consolidation and further encryption of data lends itself to public cloud storage without concern for risk of information leakage. Public cloud storage is commonly offered at a low cost and in a large capacity.

Figure 6:
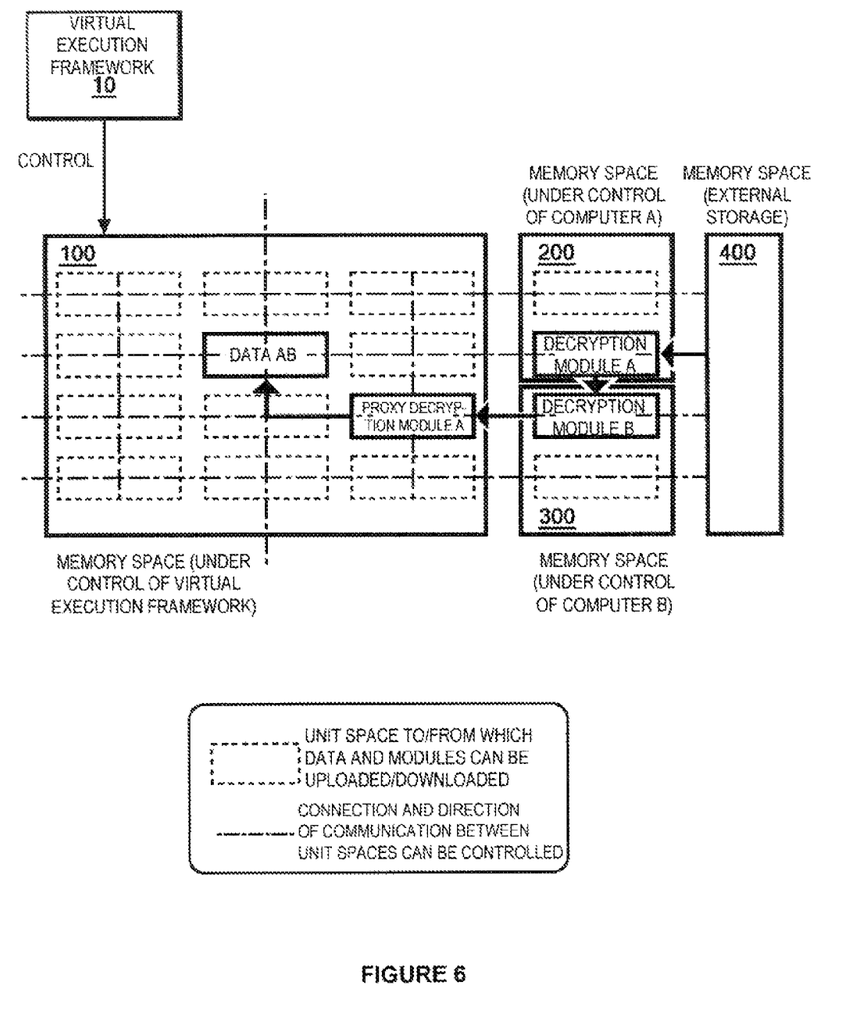
FIG. 6 schematically illustrates how data stored in an external storage is decrypted in implementing a method according to an embodiment of the invention.

FIG. 6 schematically shows how data in an external storage is decrypted in implementing a method according to an embodiment of the invention. Stored data is downloaded from the external storage 400. The data may be downloaded by one or both of the computers A and B. The data is first decrypted by the decryption module A and then by the decryption module B. The order of decryption is enforced by the virtual execution framework 10.

Prior to final restoration into the original data AB (consolidated data), the proxy decryption module A intervenes.

Figure 7:
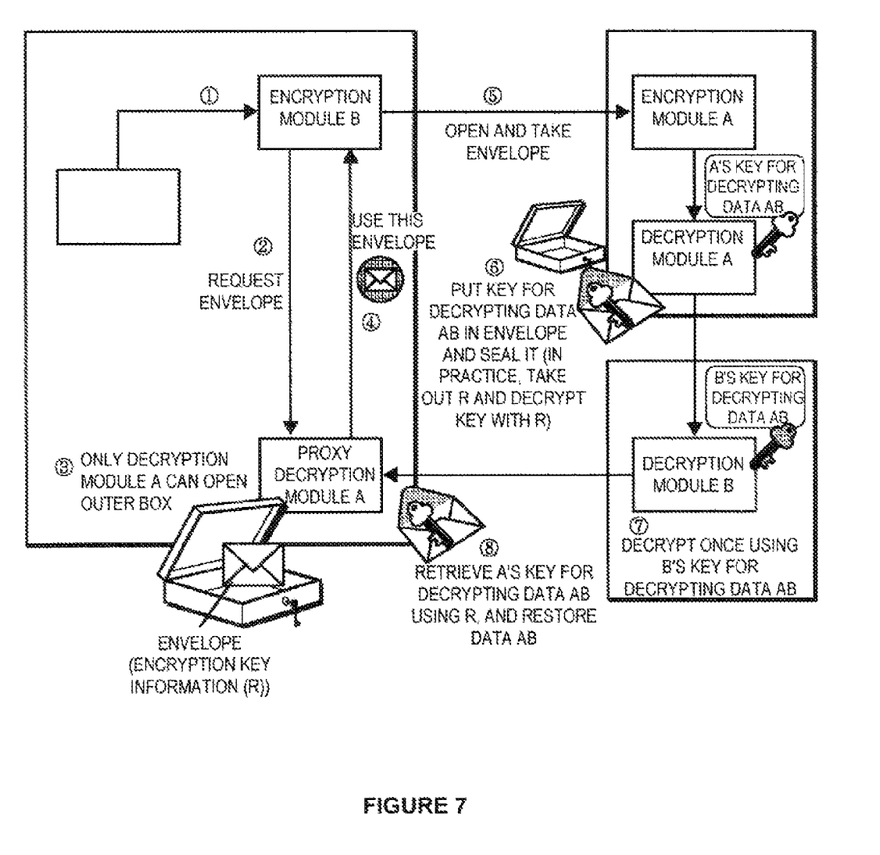
FIG. 7 shows a specific procedure of introducing encrypted information from an external module to an internal proxy module in implementing a method according to an embodiment of the invention.

FIG. 7 shows a specific procedure of introducing encrypted information from an external module to an internal proxy module in implementing a method according to an embodiment of the invention.

Input from outside the memory space 100 is directed only to the proxy decryption module A by enforcement by the virtual execution framework 10, but the order need not be B to A: communication destined for a proxy decryption module X (X={A, B}), which serves as a "proxy" to handle decryption, inside the memory space 100 has only to be enforced by the virtual execution framework 10 so that it comes only from the external decryption module Y (e.g., the one other than X).

However, for the proxy decryption module A to provide similar functions to the decryption module A, a cryptographic key that was used in the encryption module A for encryption has to be correctly conveyed to the proxy decryption module A. If the key is delivered only at a time it is required from outside to inside of the memory space 100 which is under control of the virtual execution framework 10, security is ensured in that the virtual execution framework 10 is prevented from performing both encryption and decryption by itself.

A specific procedure of retrieving data AB is as follows;

The encryption module B is to process data.

The encryption module B requests an empty envelope from the proxy decryption module A. An empty envelope refers to key R for encrypting data to placed in the envelope.

The proxy decryption module A generates R by random number generation and encrypts R with the public key, pk_A, of the computer A, thereby generating envelope data, E(pk_A, R) (where E(k, m) represents ciphertext resulting from encryption of a message m with a key k).

The proxy decryption module A sends back the envelope data to the encryption module B.

A data acquisition request by the encryption module B (attached with the envelope data) is sent to the encryption module A by enforcement.

The encryption module A wants to send A's key (designated as K_A) for undoing the double encryption of data AB to the proxy decryption module A in an encrypted format. Thus, the encryption module A decrypts the envelope data using the secret key sk_A of the computer A, which the decryption module A possesses, to obtain R, and encrypts K_A using R to generate E(R, K_A).

E(R, K_A) is sent to the decryption module B, which decrypts E(R, K_A) once using the key of B (designated as K_B) for undoing double encryption of data AB. (At this point, data AB is still encrypted with K_A.)

The decryption module B sends data AB which has been decrypted once and is encrypted with K_A to the virtual execution framework with E(R, K_A). They are directed to the proxy decryption module A according to enforcement by the virtual execution framework. R has been generated in (3) and is possessed by the proxy decryption module A. Thus, the proxy decryption module A can use R as a key to decrypt E(R, K_A) (i.e., to open the envelope) to retrieve K_A. That is, since K_A, which the external decryption module A wanted to send at (6), now resides safely at the proxy decryption module A, the module A can use K_A to perform the final decryption to obtain data AB.

Through this procedure, only the decryption module A can pack the key in the envelope and only the proxy decryption module A can retrieve the key from the envelope.

The present invention can be practiced in the form of a method or process for execution by a computer, or an apparatus to execute the same. For such computers, the virtual execution framework 10, computer A 20, computer B 30, and computer 500 of a third party (an auditing firm) have been shown as subjects to control operation. However, aforementioned matters are not requirements of the present invention except that the memory space 100 is under control of the virtual execution framework 10 and that the virtual execution framework 10 is primarily responsible for enforcement: it does not mean operations according to the present invention are impracticable unless any of the entities is involved.

Figure 8:
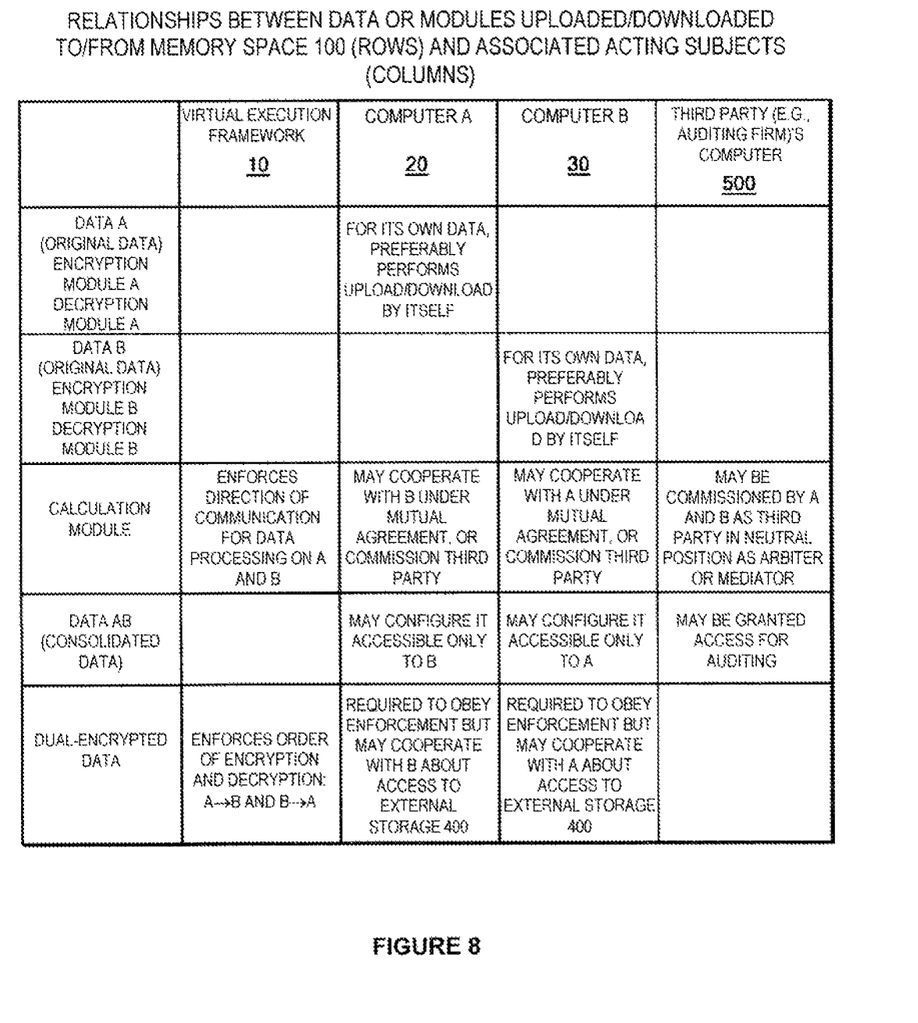
FIG. 8 shows relationships between data or modules that are uploaded or downloaded to/from a memory space 100 and associated action entities in a table format.

FIG. 8 shows relationships between data and modules that are uploaded or downloaded to/from the memory space 100, and associated acting subjects in a table format. Though it summarizes what has been described thus far, these relationships are intended to show that acting subjects are provided with freedom except for enforcement exercised by the virtual execution framework 10. Meanwhile, since the present invention does not fully permit human acts themselves to function as acting subjects, description of acting subjects should be permitted in claims depending on patent requirements of different countries. Various modifications and applications could occur to those skilled in the art so that such entities independently or cooperatively control operations without departing from the scope of the invention.

Control of the memory space 100 by the virtual execution framework 10 may be realized by a program including codes for execution by a computer, and the program may be loaded as a program constituting part of a component that functions as the virtual execution framework 10 or the memory space 100 under control of the framework 10. Alternatively, the memory space 100 or its control by the virtual execution framework 10 may be realized in a wired logic (a logic circuit) that is constructed in hardware (mainly for the purpose of enhanced processing speed).

The memory space 100 can be provided as a cloud service as an act of a service provider.

Offering of the external storage 400 can be viewed as (part of) a system that provides storage media for an archival purpose. Such provisioning may also be configured to automatically occur when the amount of data stored on the computer A 20 has exceeded a certain limit or when the amount of data stored on the computer B 30 has exceeded a certain limit.

The invention claimed is:

1. A method of storing, in an external storage, consolidated data generated from a plurality of pieces of data independently possessed by a plurality of computers by utilizing a virtual execution framework accessible to the plurality of computers, the method comprising:

uploading, by a first one of the plurality of computers, a first data set independently possessed by the first computer to a memory space which is under control of the virtual execution framework;

uploading, by a second one of the plurality of computers, a second data set independently possessed by the second computer to a memory space which is under control of the virtual execution framework;

uploading, under control of the virtual execution framework, a calculation module to a memory space which is under control of the virtual execution framework, by one of: the first computer, the second computer, or a third computer;

forcing, under control of the virtual execution framework, one of: the first computer, the second computer, or the third computer to calculate a combined data set from the first data set and the second data set using the calculation module;

uploading by the first computer a first encryption module controllable only by the first computer to a memory space which is under control of the first computer;

uploading by the second computer a second encryption module controllable only by the second computer to a memory space which is under control of the virtual execution framework;

forcing, under control of the virtual execution framework, the second computer to encrypt the combined data set using the second encryption module;

further dual-encrypting on the first computer the combined data set encrypted by the second encryption module using the first encryption module; and uploading the dual-encrypted combined data set to an external storage by the first computer or the second computer.

2. The method according to 1, further comprising:

uploading, by the first computer, a first decryption module controllable only by the first computer to a memory space which is under control of the first computer;

uploading, by the second computer, a second decryption module controllable only by the second computer to a memory space which is under control of the second computer;

downloading the dual-encrypted data from the external storage by one of the first computer and the second computer;

decrypting the downloaded data by the first computer using the first decryption module;

decrypting the downloaded data by the second computer using the second decryption module; and forcing the first computer to process the data decrypted by the second decryption module under control of the virtual execution framework.

3. The method according to 2, further comprising:

uploading, by the first computer, a first proxy decryption module controllable only by the first computer to a memory space which is under control of the virtual execution framework; and decrypting data for which processing is enforced with the first proxy decryption module.

4. The method according to 3, wherein a cryptographic key used in the first encryption module for encryption is sent to the first proxy decryption module in an encrypted format.

5. The method according to 1, further comprising:

configuring a unit space in which the first data set has been uploaded to be inaccessible to the second computer, under control of the virtual execution framework; and configuring a unit space in which the second data set has been uploaded to be inaccessible to the first computer, under control of the virtual execution framework.

6. A virtual execution framework having and controlling a memory space, the virtual execution framework comprising:

at least one hardware processor;

at least one memory operably connected to the at least one hardware processor; and a program of instruction encoded on the at least one memory and executed by the at least one hardware processor to:

provide a plurality of unit spaces to or from which data and modules can be uploaded or downloaded by a plurality of computers;

permit setting of an entity that is granted access to each of the unit spaces;

control direction of communication between data and modules uploaded in one unit space and data and modules uploaded in another unit space in the plurality of unit spaces;

control the flow in and out of at least two of the plurality of unit spaces; and control connection and direction of communication between data and modules uploaded in one unit space and data and modules uploaded in another unit space, the unit spaces including unit spaces under control of the plurality of computers and unit spaces in the memory space controlled by the virtual execution framework.

7. A computer readable tangible storage device having encoded thereon for execution by a computer a computer program configuring a virtual execution framework for loading to the virtual execution framework or a memory space controlled by the virtual execution framework, the computer program comprising:

program code to provide a plurality of unit spaces to and from which data and modules can be uploaded or downloaded by a plurality of computers;

program code to set an entity that is granted access to each of the unit spaces;

program code to control direction of communication between data and modules uploaded in one unit space and data and modules uploaded in another unit space in the plurality of unit spaces;

program code to control the flow in and out of at least two of the plurality of unit spaces; and program code to control connection and direction of communication between data and modules uploaded in one unit space and data and modules uploaded in another unit space, the unit spaces including unit spaces under control of the plurality of computers and unit spaces in the memory space controlled by the virtual execution framework.

8. A method of storing, under management of a third party only, consolidated data generated from a plurality of pieces of data independently possessed by a plurality of computers by utilizing a virtual execution framework accessible to the plurality of computers, the method comprising:

uploading, by a first computer, a first data set independently possessed by the first computer to a memory space which is under control of the virtual execution framework;

uploading, by a second computer, a second data set independently possessed by the second computer to a memory space which is under control of the virtual execution framework;

uploading a calculation module to a memory space which is under control of the virtual execution framework by one of: the first computer, the second computer, and a third computer, under control of the virtual execution framework;

forcing one of: the first computer, the second computer, and the third computer to calculate a combined data set from the first data set and the second data set using the calculation module under control of the virtual execution framework; and configuring a unit space in which the combined data set has been uploaded to be accessible only to the third computer, under control of the virtual execution framework.

9. The method according to 8, further comprising:

uploading the calculation module to a memory space which is under control of the virtual execution framework by the third computer; and forcing the third computer to calculate the combined data set from the first data set and the second data set using the calculation module under control of the virtual execution framework.

* * * * *